United States Patent
Genovese et al.

(10) Patent No.: US 7,113,230 B1
(45) Date of Patent: Sep. 26, 2006

(54) METHOD AND APPARATUS FOR DERIVING A CHANNEL MAP FOR A DIGITAL TELEVISION RECEIVER

(75) Inventors: Dave Genovese, Rochester, NY (US); David C. Goodwin, Yardley, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/528,083

(22) Filed: Mar. 17, 2000

(51) Int. Cl.
*H04N 5/445* (2006.01)
*H04N 7/16* (2006.01)

(52) U.S. Cl. .................. 348/731; 725/38; 725/151
(58) Field of Classification Search .............. 725/38, 725/70, 44, 100, 131, 139, 151; 348/731, 348/732

See application file for complete search history.

(56) References Cited

U.S. PATENT DOCUMENTS

| | | | | |
|---|---|---|---|---|
| 4,254,506 A | * | 3/1981 | Henderson et al. ...... 455/154.2 |
| 4,367,558 A | * | 1/1983 | Gercekci et al. ......... 455/164.2 |
| 4,422,096 A | * | 12/1983 | Henderson ................. 348/731 |
| 4,425,578 A | * | 1/1984 | Haselwood et al. ......... 725/14 |
| 4,499,606 A | * | 2/1985 | Rambo .................... 455/277.2 |
| 4,763,195 A | | 8/1988 | Tults |
| 4,897,727 A | * | 1/1990 | Richards .................... 348/734 |
| 4,939,789 A | * | 7/1990 | Sakashita et al. ........... 455/260 |
| 5,182,646 A | | 1/1993 | Keenan |
| 5,315,392 A | | 5/1994 | Ishikawa et al. |
| 5,771,080 A | * | 6/1998 | Sakakibara ................. 348/731 |
| 5,995,563 A | | 11/1999 | Ben-Efraim et al. |
| 6,115,074 A | * | 9/2000 | Ozkan et al. ............... 348/465 |
| 6,118,498 A | * | 9/2000 | Reitmeier .................... 348/725 |
| 6,124,898 A | * | 9/2000 | Patel et al. ................. 348/607 |
| 6,137,546 A | * | 10/2000 | Shintani et al. ............. 348/731 |
| 6,188,448 B1 | * | 2/2001 | Pauley et al. ............... 348/731 |
| 6,212,680 B1 | * | 4/2001 | Tsinberg et al. .............. 725/39 |
| 6,337,719 B1 | * | 1/2002 | Cuccia ........................ 348/731 |
| 6,405,372 B1 | * | 6/2002 | Kim et al. .................... 725/50 |
| 6,421,099 B1 | * | 7/2002 | Oh ............................. 348/732 |
| 6,442,757 B1 | * | 8/2002 | Hancock et al. .............. 725/50 |
| 6,445,425 B1 | * | 9/2002 | Limberg ..................... 348/731 |
| 6,483,547 B1 | * | 11/2002 | Eyer .......................... 348/473 |
| 6,486,925 B1 | * | 11/2002 | Ko ............................. 348/731 |
| 6,538,704 B1 | * | 3/2003 | Grabb et al. ................. 348/731 |

* cited by examiner

*Primary Examiner*—Kieu-Oanh Bui
(74) *Attorney, Agent, or Firm*—RatnerPrestia

(57) ABSTRACT

A television receiver includes circuitry that quickly derives a channel map for a DTV receiver. The apparatus includes tuner that is controlled by a processor in the television receiver to periodically test each channel frequency to determine the strength of the signal at that frequency. If the signal strength exceeds a threshold value, the channel map is updated to indicate that a channel exists at that frequency. The processor monitors the signal recovered by the tuner during normal television viewing for valid program information. If the processor does not detect valid program information for a channel in the program map, the threshold value used by the processor to build the channel map is raised. If the processor detects valid program information then information on the estimated noise level in the received DTV signal is used to update the threshold value. In one embodiment of the invention, the television receiver includes both a main tuner and an auxiliary tuner. The auxiliary tuner is controlled to periodically scan the television channel frequencies to update the channel map, even when the main tuner is being used by a viewer who is watching television.

10 Claims, 4 Drawing Sheets

METHOD AND APPARATUS FOR DERIVING A CHANNEL MAP FOR A DIGITAL TELEVISION RECEIVER

FIELD OF THE INVENTION

The present invention relates to tuning systems for digital television (DTV) receivers and, in particular to a system and method for quickly deriving a channel map for the DTV receiver.

BACKGROUND OF THE INVENTION

The number of television programs that a viewer may receive at any given time has increased geometrically in the last few years. Conventional analog television systems such as those conforming to the National Television Standards Committee (NTSC) and Phase Alternate Line (PAL) standards transmit one program per 6 MHz or 8 MHz channel. Recently, digital television signal processing techniques have been developed that allow multiple programs to be transmitted in each 6 MHz channel. Furthermore, there are now many sources of television signals In addition to the conventional terrestrially broadcast signals, a viewer may receive television signals, for example, via wired cable systems, several different types of satellite systems, so-called wireless cable systems and, in the near future, via a global information network, such as the Internet.

Conventional cable television systems are capable of delivering 140 six MHz channels and some systems are capable of delivering over 200 channels via a coaxial cable. Presently, new technology is being investigated to increase the number of programs that can be delivered to the home. This is being done via two technologically strategic moves. The first is to increase the allocated bandwidth to 1 GHz (which provides for 150 six MHz channels). The second is to use video compression to configure a channel to carry up to 10 minor channels in one 6 MHz wide major channel. Channels that include a plurality of minor channels are also known as multiprogram channels. Typical numbers that are used in the industry estimate that about 500 programs can be delivered to the home over a single coaxial cable. Fiber optic cable provides many times the bandwidth of a coaxial cable and promise to be able to provide several thousand programs. In the same way, increased bandwidth for satellite systems may allow a viewer to receive upwards of 1,000 six MHz channels, each channel containing up to ten minor channels.

The digital coding that allows a single television channel to contain more than one minor channel also makes the channels more difficult to decode. While an analog television receiver may be able to tune to a new channel and recover a television signal in a matter of milliseconds, a DTV receiver needs more time. This is because a typical digital television signal is first encoded according to the standard adopted by the Moving Picture Experts Group (MPEG) to provide a digital bit-stream. The digital bit stream is then used to modulate a radio frequency (RF) carrier using quadrature amplitude modulation (QAM) or trellis coded vestigial side-band (VSB) modulation techniques. In order to receive a program transmitted on a DTV channel, therefore, a receiver must tune the receiver to the channel frequency, phase-lock the tuner to the DTV signal, demodulate the signal and then decode the demodulated signal. For a typical DTV signal, this process may take four to ten seconds for each major channel.

Television receivers manufactured in the last few years typically include a tuning memory that stores tuning information for active channels which may be received by the television receiver. This information is commonly referred to as a channel map. The tuning memory may store, for example, a list of channels for which valid RF television signals are present and tuning information that may be used to set the television tuner to quickly recover the RF carrier. This list is used to step sequentially through channels when a viewer is watching television. As a viewer presses the channel up key on the remote control, a microprocessor in the television receiver accesses the channel map and provides information for the next channel in the list to the tuner.

In a typical analog television receiver, the channel map is derived using a set-up function accessed via the control menu of the receiver. The set-up function sequentially scans the tuner from the lowest channel frequency to the highest channel frequency, attempting to tune each channel as it is encountered. Only channels that provide valid television signals are added to the channel map.

While this system works well for analog television receivers, it may not be appropriate for DTV receivers. First, as described above, it takes considerably more time for a digital television decoder to determine if a valid signal exists at a channel frequency. Second, the existence of valid programming at the various channel frequencies may change more often in a DTV environment, such as a satellite broadcast, than in a traditional terrestrial broadcast environment, for example, due to changing weather conditions or sun-spot events. These events may affect the strength of the received satellite signal and make some of the channels temporarily unavailable. Thus, for a DTV receiver if conventional methods are used to generate a channel map, not only will it take more time but it will need to be done more often.

SUMMARY OF THE INVENTION

The present invention is embodied in a method and apparatus which quickly derives a channel map for a DTV receiver. The apparatus includes a tuner that is controlled by a processor in the television receiver to test a channel frequency to determine the amplitude of the signal at that frequency. The processor uses this value to determine if a valid DTV channel is likely to exist at the frequency. If the amplitude exceeds a threshold value, the processor updates the channel map to indicate that a valid signal is available at that frequency.

According to one aspect of the invention, the processor monitors the signal recovered by the tuner during normal television viewing for valid program information. If a program exists at a frequency in the channel map, then the processor uses an instantaneous noise estimate generated by the demodulator to update the threshold value.

According to another aspect of the invention, If the processor does not detect valid program information for a channel in the program map, the threshold value used by the processor to build the channel map is changed such that only channels having signals of greater amplitude are detected.

According to another aspect of the invention, the television receiver includes a main tuner and an auxiliary tuner. The auxiliary tuner periodically scans the television channel frequencies even when the main tuner is being used by a viewer who is watching television.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
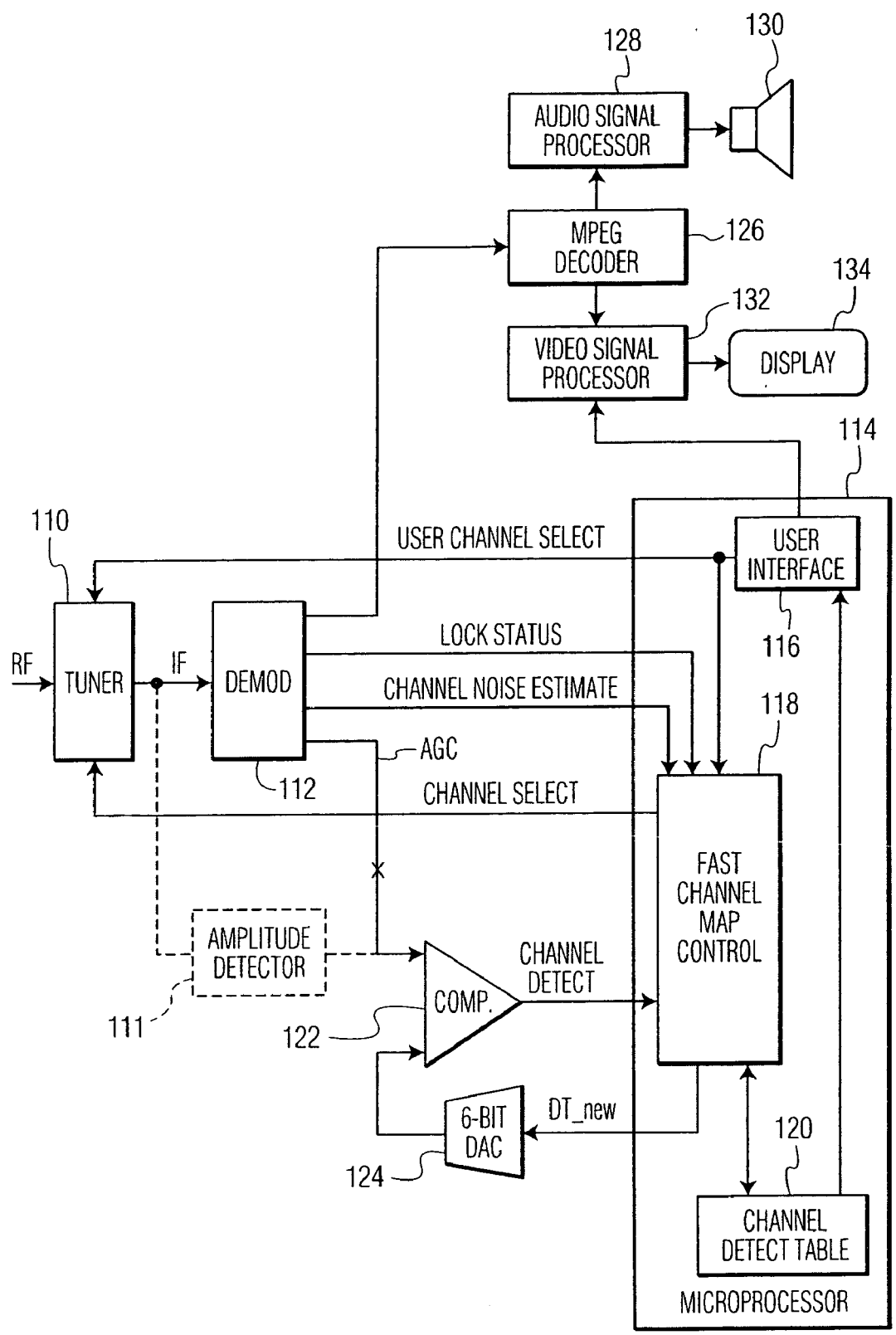
FIG. 1 is a block diagram of a television receiver including a first embodiment of the present invention.

FIG. 1 is a block diagram of a first embodiment of the present invention. In FIG. 1, RF Television signals are received by a tuner 110 and converted to intermediate frequency (IF) signals that are applied to a demodulator 112. The tuner 110 is controlled by two channel select signals, A user channel select signal provided by a user interface process 116 of the microprocessor 114 and a channel select signal provided by a fast channel map control process 118 of the microprocessor 114. In this exemplary embodiment of the invention, the fast channel map is generated only in a setup interval during which the viewer may not use the television receiver.

The tuner 110 is a conventional cable television or satellite tuner and may be, for example, the CN2811 digital cable tuner RF integrated circuit manufactured by Conexant. The demodulator 112 provides four signals, a demodulated video signal, a lock status signal, a channel noise estimate signal, and an automatic gain control (AGC) signal. The AGC signal is used in the exemplary embodiment of the invention as an indication of the amplitude of the received IF signal. It is well known that the amplitude of this signal is inversely proportional to the amplitude of the received DTV signal. To allow the fast channel map control process 118 to use the AGC signal as a measure of signal amplitude Alternatively, as shown in phantom in FIG. 1, a separate amplitude detector 111 may be used to determine the amplitude of the IF signal provided by tuner 110. This circuit may include, for example, a rectifier (not shown) that converts the IF signal into a direct current (DC) signal and a tuned circuit (not shown) (e.g. a resistor-capacitor circuit), coupled between the rectifier and ground, which tracks the peak amplitude of the rectified IF signal.

In the exemplary embodiment of the invention, the lock status signal and the channel noise estimate signal are stored in digital registers internal to the demodulator 112. These signals are accessed by the microprocessor 114 via an I²C bus (not shown). The demodulator 112 may be, for example, a BCM3125 QAMLINK universal set-top box transceiver, manufactured by Broadcom, Inc.

The demodulated baseband DTV signal from the demodulator 112 is provided to an MPEG decoder 126 that, under control of microprocessor 114, decodes the DTV signal into separate audio and video information signals. The audio information signal is applied to an audio signal processor 128 which generates analog audio signals that are applied to a speaker system 130.

The video information signal is applied to a video signal processor 132 that generates analog video signals for application to a display device 134. In the exemplary embodiment of the invention, the user interface process 116 of the microprocessor 114 is also coupled to the video signal processor 132 to provide menus and other information to the viewer via an on-screen display process (not shown). In addition, the user interface 116 includes a remote control receiver (not shown) that is configured to receive commands from a viewer remote control device (not shown).

The user channel select signal provided by the user interface process 116, and the lock status and channel noise estimate signals provided by the demodulator 112 are all applied to the fast channel map control process 118 of the microprocessor 114. The operation of the fast channel map control process is described below with reference to FIGS. 3 and 4.

The amplitude signal provided by the demodulator 112 or the amplitude detector 111 is applied to a comparator 122. The use of this signal is described below with reference to FIG. 3. The amplitude signal provided by the demodulator 112 may be derived from the in band automatic gain control signal provided by the demodulator. This signal is inversely proportional to the amplitude of the received IF signal.

Comparator 122 is coupled to receive a threshold value from the fast channel map control process 118 via a digital to analog converter 124. The output signal of the comparator 122 is a channel detect signal. This signal is provided when the detected amplitude of the IF signal, as provided by the amplitude detector 111, is greater than the threshold value provided by the fast channel map control process. If the in band AGC signal of the demodulator 112 is used as the amplitude signal, however, the comparator 122 may provide the channel detect signal when the ACG signal is less than the threshold value provided by the digital to analog converter 124.

In addition to the user interface process 116 and the fast channel map control process 118, the microprocessor 114 includes a channel detect table 120. This table contains the channel map for the television receiver. The user interface process 116 is coupled with the channel detect table to obtain the current channel map for use by the viewer when watching television.

Briefly, the embodiment of the invention shown in FIG. 1 operates as follows. During a setup operation, the fast channel map control process 118 controls the tuner via the channel select signal to sequentially scan every television signal frequency that can be received by the tuner 110. As each channel frequency is scanned, the tuner is held at the frequency for a brief interval (e.g. 30 milliseconds) and the amplitude of the signal at that frequency is measured. The signal amplitude is compared to the threshold amplitude provided by the channel map control process to determine if a channel exists at that frequency. The threshold value is adjusted based on the channel noise estimate provided by the demodulator 112. In addition, after the setup process is complete, when the viewer is watching television, each time the viewer changes the channel on the DTV receiver, the viewer channel select is analyzed by the fast channel map control process 118 to determine if a television program actually exists at the selected channel. If no television program exists at a selected channel, then the threshold value used by the fast channel map control process is increased and the fast channel map control process is scheduled to run the next time that the television receiver is not in use by the viewer to update the channel map.

Because the exemplary embodiment of the invention shown in FIG. 1 does not actually demodulate the DTV signals when it builds the channel map, the process of building a channel map takes only a relatively short amount of time.

The one disadvantage of the embodiment of the invention shown in FIG. 1 is that it may only build a channel map when the viewer is not using the DTV receiver. If, for example, the initial threshold value used to build the channel map is too low, the viewer may have many erroneous channels in the channel map table 120. As described above, in the first embodiment of the invention, this table is updated only when the viewer is not using the television receiver. Consequently the viewer may need to rerun the setup process or turn off the television receiver if the channel map contains many erroneous channels.

Figure 2:
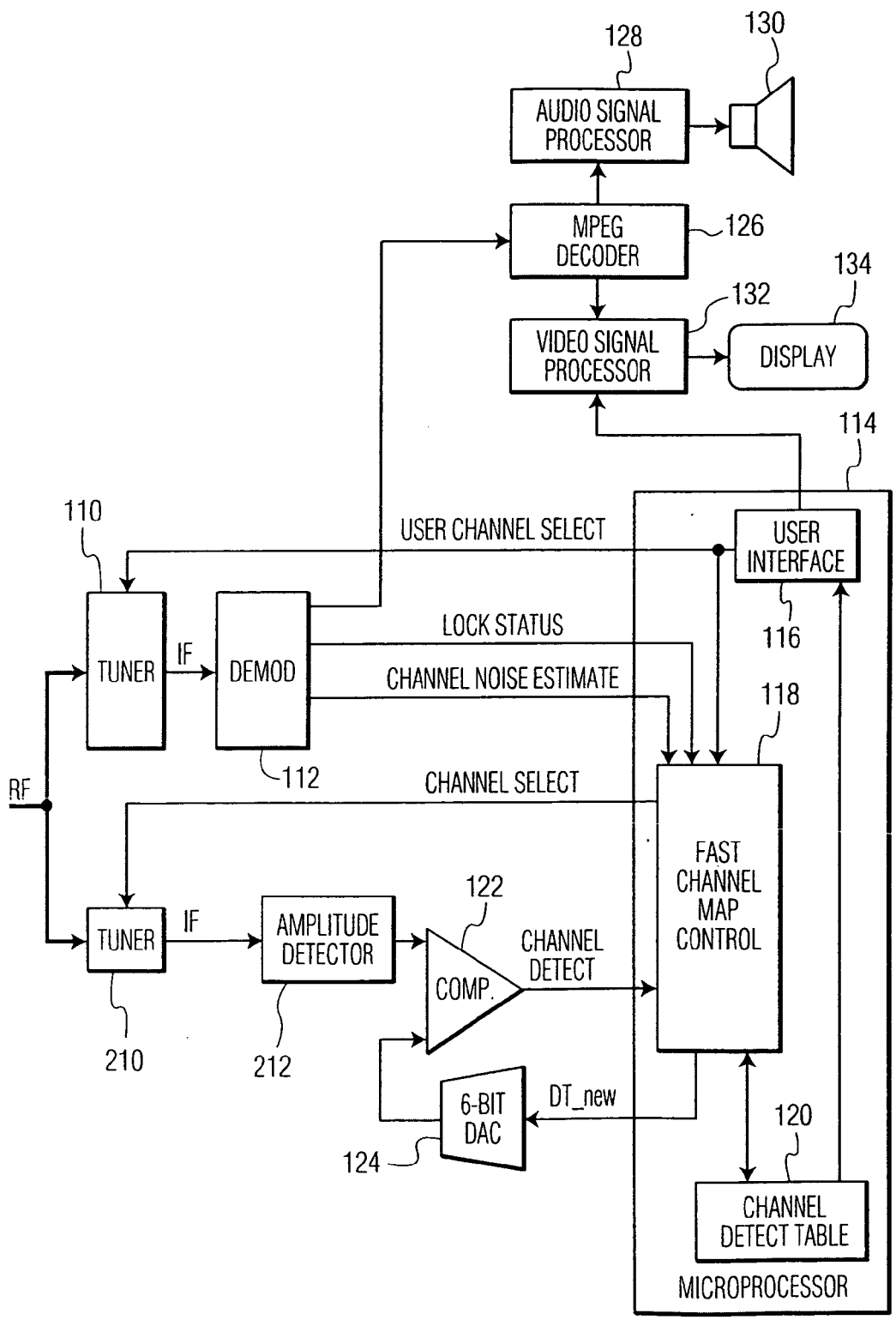
FIG. 2 is a block diagram of a television receiver including a second embodiment of the present invention.

This deficiency of the embodiment of the invention shown in FIG. 1 may be corrected by including an auxiliary tuner 210 as shown in FIG. 2. The auxiliary tuner 210 may, for example, be a CT10 Up/Down Converter for CATV Receiver manufactured by Panasonic Corporation. The output signal of the tuner 210 is applied to an amplitude detector 212 that generates the amplitude signal for the comparator 122. The exemplary amplitude detector 212 may be of the same construction as the amplitude detector 111, described above. The tuner 210 is coupled to receive the channel select signal provided by the fast channel map control process 118. The user channel select signal is applied to the tuner 110. Because the tuner 210 is used only for the fast channel map control process 118, the channel map may be generated continually, even when the viewer is using the television receiver.

Figure 3:
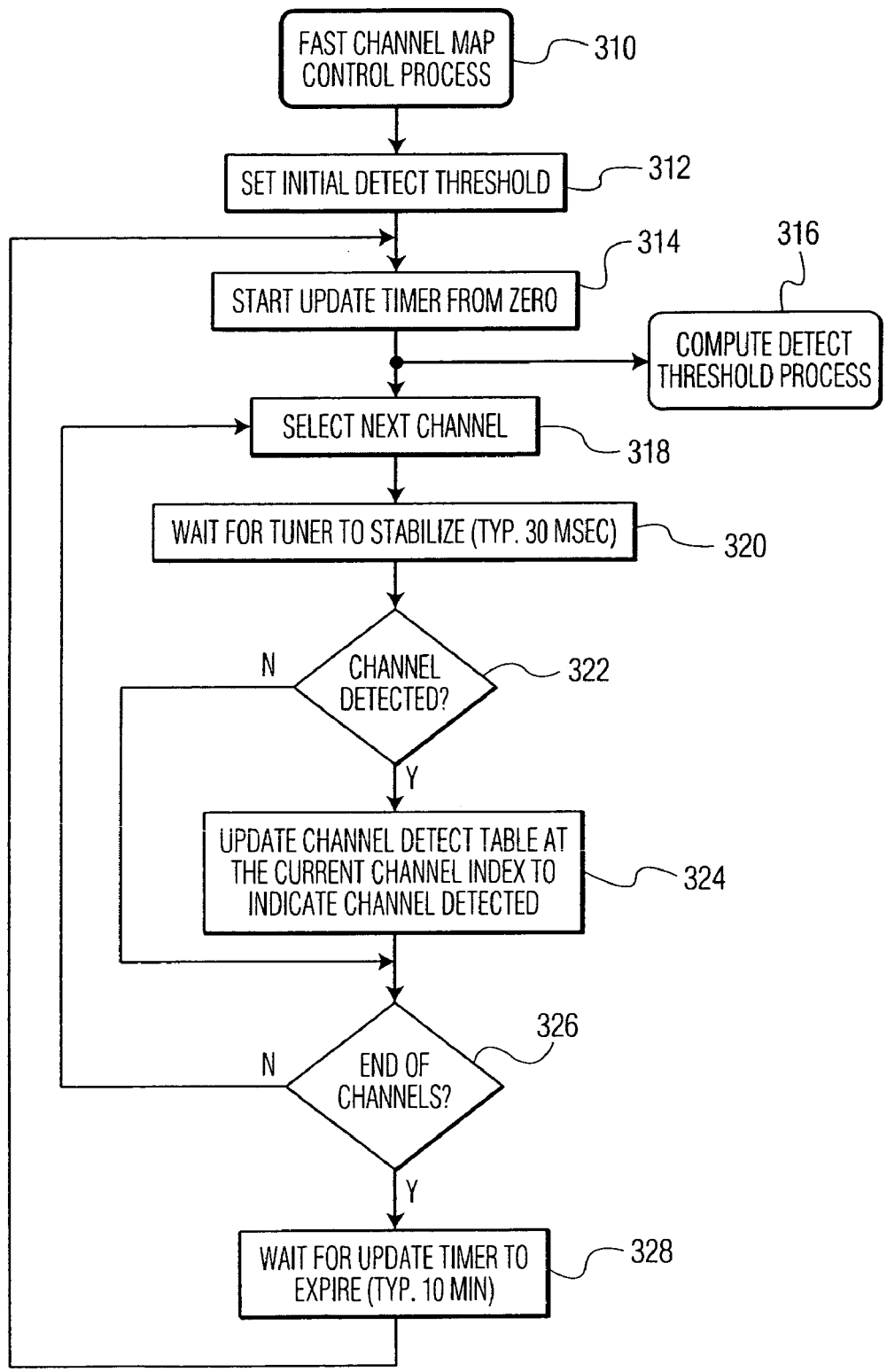
FIG. 3 is a flow-chart diagram that is useful for describing the operation of the present invention

FIG. 3 is a flowchart diagram that illustrates the operation of the fast channel map control process 118. The process begins at step 310 by resetting all of the entries in the channel detect table 120. At step 312, the process sets an initial detect threshold, DT_new, this value is set, for example, to a value just below the expected amplitude of the intermediate frequency signal for a moderate to strong digital television channel. At step 314, the process resets the update timer to zero. Next, at step 316, the fast channel map control process branches a separate compute detect threshold process 316 as a separately executing thread. This process is described below with reference to FIG. 4. After step 316, the fast channel map control process executes step 318 that causes the tuner 210 (or 110 in the embodiment shown in FIG. 1) to select the next channel responsive to the channel select signal. At step 320, the process waits for the tuner to stabilize. This waiting period is typically about 30 milliseconds.

At step 322, the process samples the output signal provided by the comparator 122 to determine if the amplitude of the signal detected at the selected channel is greater than the current detect threshold value (DT_new). If so, then step 324 is executed which updates the channel detect table to indicate that a valid DTV channel exists at the current channel position. If, at step 322, the output signal of the comparator 122 indicates that no channel is present than step 324 is skipped. After step 322 or step 324, step 326 is executed to determine if the last channel has been processed for this iteration of the fast channel map control process. If more channels are to be processed, control transfers from step 326 to step 318 to select the next channel, otherwise control transfers to step 328.

At step 328, the process waits for the update timer to expire. When the timer expires, typically after a ten minute interval, control transfers to step 314 to reset the update timer and perform the channel map control process again. The update timer is used in the embodiment of the invention shown in FIG. 2 where the fast channel map control process may run even when the viewer is using the television receiver. If, instead, the embodiment of the invention shown in FIG. 1 is used, the fast channel control map process may be run a number of times, for example, twice, during each setup interval, and each time immediately after the viewer has turned off the television receiver. In this instance, step 328 would not be used and the process would end after the last channel had been processed as determined in step 326.

Figure 4:
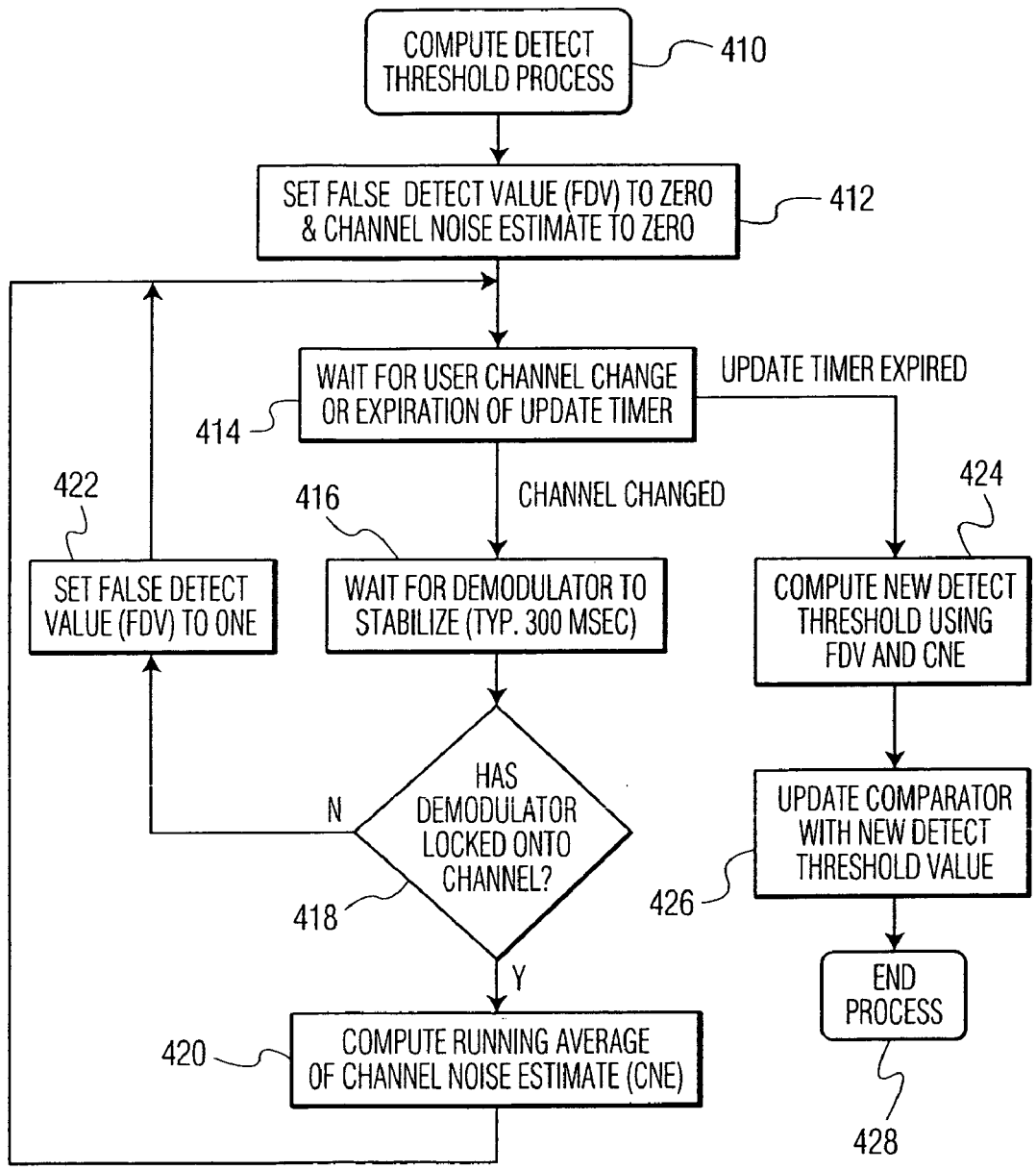
FIG. 4 is a flow-chart diagram that illustrates the compute detect threshold process shown in FIG. 3.

FIG. 4 is a flowchart diagram that illustrates the compute detect threshold process shown at step 316 of FIG. 3. This process begins at step 410. Step 412 sets the false detect value (FDV) to zero and then sets the channel noise estimate value to (CNE) to zero. After step 412, the process executes step 414, which waits for the user to change a channel or waits for the update timer to expire. When a channel change requested by the viewer occurs in step 414, control transfers to step 416, which waits for the demodulator 112 to stabilize. This interval is typically about 300 milliseconds. After the demodulator has stabilized in step 416, step 418 determines if the demodulator has locked onto a channel. If the demodulator has not locked onto a channel, it is assumed that the information in the channel map is erroneous and that no digital television channel exists at that frequency. In this instance, step 422 is executed, which sets FDV to 1, and control is transferred to step 414, described above. If, however, at step 418, the demodulator 110 has locked onto a channel, then step 420 is executed which accesses the channel noise estimate value from the demodulator 112 and adds this value to a running average of the channel noise estimate (CNE). After step 420, control transfers to step 414 as described above.

If, at step 414, the update timer expires before the user changes channels, step 424 is executed which computes a new detect threshold value using the values of FDV and CNE computed at steps 422 and 420, respectively. The new threshold value is calculated as described by equations (1) through (7).

$$DT\_new = DT\_old + \Delta MTA + FDV * TINC \tag{1}$$

$$\Delta MTA = MTA\_new - MTA\_old \tag{2}$$

$$MTA\_new = (MSA\_new^2 + CNE\_new^2)^{1/2} \tag{3}$$

$$MSA\_new = 10^{(SNR\_T/10 + \log CNE\_old^2)} \tag{4}$$

$$MTA\_old = (MSA\_old^2 + CNE\_old^2)^{1/2} \tag{5}$$

$$MSA\_old = 10^{(SNR\_T/10 + \log CNE\_old^2)} \tag{6}$$

$$TINC = DAC\_output\_voltage\_range/64 \tag{7}$$

Where, DT_new is the detect threshold for current update cycle; DT_old is the detect threshold from the previous update cycle; MTA_new is the minimum tuner amplitude for the current update cycle; MTA_old is the minimum tuner amplitude from the previous update cycle; CNE_new is the channel noise estimate (computed by the demodulator 112) for the current update cycle; CNE_old is the channel noise estimate from the previous update cycle; SNR_T is the minimum signal-to-noise ratio set for the demodulator 112; and FDV is the false detect value (which is one if one or more false channels have been detected).

At step 426 the process updates the comparator with a new detect threshold value (DT_new). After step 426 the process ends at step 428.

The Apparatus and method described above generate a channel map for a digital television transmission system rapidly by determining only that a signal of sufficient strength exists at a prospective channel position rather than by tuning and recovering channel information at that channel frequency. Errors in the fast channel map generation process are monitored and used to update the threshold values used by the process. The process desirable runs continually in order to maintain a map of currently available channels.

While the invention has been described in terms of exemplary embodiments, it is contemplated that it may be practiced as described above with modifications that are within the scope of the attached claims.

What is claimed is:

1. Apparatus for deriving a channel map for a digital television (DTV) receiver comprising;
    a processor including a channel map data structure;
    a tuner, controlled by the processor to tune to a specified channel and provide a tuned television signal having an amplitude;
    a demodulator coupled to the tuner to demodulate the tuned television signal;
    an amplitude detector coupled directly to the tuner to provide a measure of the amplitude of the tuned television signal prior to the demodulation of the tuned television signal; and
    a comparator, configured to compare the measure of amplitude provided by the amplitude detector to a threshold value and to provide an output signal having a first value if the measure of amplitude is greater than the threshold value and having a second value otherwise;
    wherein the processor is responsive to the output signal of the comparator having the first value, to change a value in the channel map data structure to indicate that the specified channel is received by the DTV receiver.

2. Apparatus according to claim 1, wherein:
    the demodulator demodulates the tuned television signal to provide a baseband DTV signal; and
    the processor further includes:
    a user interface through which a user may cause the tuner to tune to a channel frequency indicated as being received by the DTV receiver in the channel map; and
    means for monitoring the output signal of the demodulator to determine if the baseband DTV signal is present and for adjusting the threshold value if the baseband DTV signal is not present.

3. Apparatus according to claim 2, wherein the demodulator further provides a measure of estimated noise in the received DTV signal and the means for monitoring the output signal of the demodulator to determine if the baseband DTV signal is present, includes means for obtaining the measure of estimated noise from the demodulator if the baseband DTV signal is present and means for adjusting the threshold value based on the measure of estimated noise.

4. Apparatus for deriving a channel map for a digital television (DTV) receiver comprising:
    a processor including:
    a channel map data structure configured to contain data values indicating specific channel frequencies that are received by the DTV receiver; and
    a user interface through which a user may specify a desired channel frequency from among the channel frequencies contained in the channel map data structure;
    a first tuner, controlled by the processor to tune to a specified channel and provide a first tuned television signal having an amplitude;
    a second tuner, controlled by the processor in response to a desired channel frequency entered by a user through the user interface to provide a second tuned television signal;
    a demodulator, coupled to the second tuner to demodulate the second tuned television signal to recover a baseband DTV signal therefrom;
    an amplitude detector coupled to the first tuner to provide a measure of the amplitude of the tuned television signal; and
    a comparator, configured to compare the measure of amplitude provided by the amplitude detector to a threshold value and to provide an output signal having a first value if the measure of amplitude is greater than the threshold value and having a second value otherwise;
    wherein the processor is responsive to the output signal of the comparator having the first value, to change a value in the channel map data structure to indicate that a the specified channel is received by the DTV receiver and is responsive to the demodulator to increase the threshold value if the demodulator does not provide a baseband signal for the channel frequency requested by a user.

5. Apparatus according to claim 4, wherein the second tuner further provides a measure of estimated noise in the received DTV signal and the processor includes means for obtaining the measure of estimated noise from the second tuner when the baseband DTV signal is present and means for adjusting the threshold value based on the measure of estimated noise.

6. A method for deriving a channel map for a digital television (DTV) receiver comprising the steps of:
    tuning the DTV receiver to a specified channel frequency to provide a tuned television signal having an amplitude;
    demodulating the tuned television signal to provide a demodulated tuned television signal;
    measuring the amplitude of the tuned television signal prior to the step of demodulating the tuned television signal;
    comparing the measure of amplitude to a threshold value to determine if sufficient signal amplitude exists at the specified channel frequency to indicate a valid channel; and
    adding an indication that the specified channel is present to the channel map responsive to the comparing step indicating that the specified channel frequency has sufficient signal amplitude to indicate is a valid channel.

7. A method according to claim 6, further comprising the steps of:
    tuning the DTV receiver to a channel frequency indicated as being present in the channel map; and
    changing the threshold value if the demodulated tuned television signal is not a baseband DTV signal.

8. A method according to claim 7, further including the steps of calculating the threshold value as a function of noise in the tuned television signal and whether any channel in the channel map does not correspond to a DTV signal; and measuring the noise in the tuned television signal when the demodulated tuned television signal is a baseband DTV signal;

wherein the step of changing the threshold value if the demodulated tuned television signal is not a baseband DTV signal includes the step of setting a value indicating that a channel in the channel map does not correspond to a DTV channel.

9. A method according to claim 6, further including the step of repeating the method of claim 6 for all possible channel frequencies that may be tuned by the DTV receiver.

10. A method according to claim 9, further including the step of periodically repeating the method of claim 9 at predetermined intervals to maintain a current channel map.

* * * * *